No. 838,464. PATENTED DEC. 11, 1906.
G. O. SCHULTZE & O. SCHÜSSLER.
MEANS FOR UNIFORMLY DISTRIBUTING POWDERED SUBSTANCES.
APPLICATION FILED SEPT. 7, 1906.
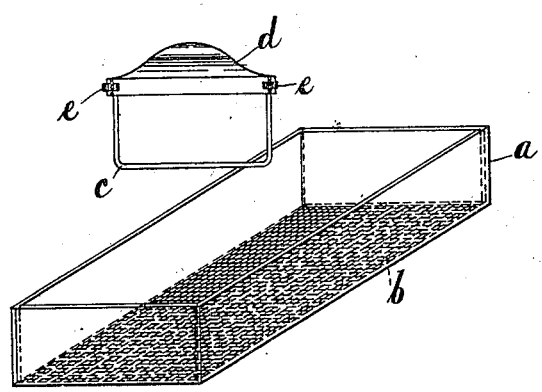
Witnesses:
N. Reynolds
M. Taylor
Inventors:
Gustav Oskar Schultze
and Otto Schüssler
by Georgii & Massie
his Attorneys

UNITED STATES PATENT OFFICE.

GUSTAV OSKAR SCHULTZE, OF VISLANDA, SWEDEN, AND OTTO SCHÜSSLER, OF KOTTBUS, GERMANY.

MEANS FOR UNIFORMLY DISTRIBUTING POWDERED SUBSTANCES.

No. 838,464.     Specification of Letters Patent.     Patented Dec. 11, 1906.

Application filed September 7, 1906. Serial No. 333,664.

*To all whom it may concern:*

Be it known that we, GUSTAV OSKAR SCHULTZE, a subject of the King of Sweden, and a resident of Vislanda, in the Kingdom of Sweden, and OTTO SCHÜSSLER, a subject of the German Emperor, and a resident of Ströbitz, Kottbus, in the Empire of Germany, have invented certain new and useful Improvements in Means for Uniformly Distributing Powdered Substances, of which the following is a specification, reference being had therein to the accompanying drawing.

In the manufacturing of special articles—as, for instance, roofing-disks of cement having the surface colored, made close, &c.—by means of a suitable substance the said substance is generally spread on the article by means of a sieve manually operated, as by reciprocating the same. The said method of spreading the substance is time-consuming, and the results are unsatisfactory as the substance thus spread does not have the same thickness all over.

This invention relates to means for distributing uniformly a powdered substance. The said means consists in a wire or sliding scraper provided with a suitable handle adapted to be reciprocated on the bottom of a sieve on which the powdered substance is spread until a layer of the desired thickness is formed on the subjacent article—as, for instance, a roofing-tile.

Means adapted for carrying out the said method are shown in perspective in the accompanying drawing.

*a* is a box or casing, the bottom *b* of which consists of wire-cloth.

*c* is a wire or bar provided with a handle *d*, the whole constituting a scraper. The width of the said scraper is preferably so adapted, as shown in the drawing, that it fits snugly between the walls of the box, by which it is guided when reciprocated. The ends of the scraper bearing against the said walls may be provided with antifriction-rolls *e*. The said wire or rod *c* is preferably made of a metal softer than that of the bottom *b*, so that the latter is worn in the slightest possible degree. When the wire *c* is worn out, it can easily be substituted by a new one without any considerable expense. In moving the said scraper, &c., forward and backward one or many times bearing against the bottom of the box uniform quantities of the powder or dust are transmitted through the sieve or scraped off and caused to pass through the same, so that an equally thick layer of substance is always provided on the subjacent article. Although it is said in the above description that the scraper is provided with only one wire or bar it may evidently be provided with two or more wires, &c., mounted one behind the other, the path of the scraper being thus shortened.

Having now described our invention, what we claim as new, and desire to secure by Letters Patent, is—

1. In a distributer for coating articles with powder, the combination, with a box having a perforated bottom, of a scraper comprising a narrow thin straight edge of a length corresponding to the interior width of the box with upturned ends, and a handle joining the ends.

2. In a distributer for coating articles with powder, the combination, with a box having a screen-bottom, of a scraper comprising a wire forming a straight edge of a length corresponding to the interior width of the box with upturned ends, and a handle joining the wire ends.

3. In a distributer for coating articles with powder, the combination, with a box having a bottom of screen-cloth, of a scraper comprising a wire forming a straight edge of a length corresponding to the interior width of the box, said wire having its ends upturned at right angles to the straight edge, a handle connecting the wire ends, and antifriction members arranged at each end of the scraper.

In testimony whereof we have signed our names to this specification in the presence of two subscribing witnesses.

GUSTAV OSKAR SCHULTZE.
    OTTO SCHÜSSLER.

Witnesses:
    HENRY HASPER,
    WOLDEMAR HAUPT.